United States Patent
Charnesky

(10) Patent No.: US 8,712,648 B2
(45) Date of Patent: Apr. 29, 2014

(54) PASSIVE CHARGE CORD RELEASE SYSTEM FOR AN ELECTRIC VEHICLE

(75) Inventor: Scott P. Charnesky, Birmingham, MI (US)

(73) Assignee: GM Global Technology Operations, Detroit, MI (US)

( * ) Notice: Subject to any disclaimer, the term of this patent is extended or adjusted under 35 U.S.C. 154(b) by 59 days.

(21) Appl. No.: 13/042,766

(22) Filed: Mar. 8, 2011

(65) Prior Publication Data
US 2012/0232761 A1 Sep. 13, 2012

(51) Int. Cl.
- H01R 13/62 (2006.01)
- H01R 43/26 (2006.01)
- H01R 13/627 (2006.01)
- B60L 11/18 (2006.01)

(52) U.S. Cl.
CPC ............ H01R 43/26 (2013.01); H01R 13/6272 (2013.01); H01R 2201/26 (2013.01); B60L 11/1818 (2013.01)
USPC ............................... 701/49; 439/34; 439/304

(58) Field of Classification Search
USPC .................................................. 439/527, 136
See application file for complete search history.

(56) References Cited

U.S. PATENT DOCUMENTS

| | | | |
|---|---|---|---|
| 4,669,791 A * | 6/1987 | Savill ............................. | 439/34 |
| 4,754,255 A | 6/1988 | Sanders et al. | |
| 4,757,304 A | 7/1988 | Rho | |
| 4,898,010 A | 2/1990 | Futami et al. | |
| 5,077,831 A | 12/1991 | Weber | |
| 5,134,392 A | 7/1992 | Takeuchi et al. | |
| 5,350,312 A * | 9/1994 | Kuno et al. ................... | 439/310 |
| 5,442,341 A | 8/1995 | Lambropoulos | |
| 5,458,496 A * | 10/1995 | Itou et al. ........................ | 439/34 |
| 5,536,173 A * | 7/1996 | Fujitani et al. .................. | 439/34 |
| 5,955,981 A | 9/1999 | Rangan | |

(Continued)

FOREIGN PATENT DOCUMENTS

| CN | 201080170 Y | 7/2008 |
|---|---|---|
| CN | 201372630 Y | 12/2009 |

(Continued)

OTHER PUBLICATIONS

Harper, P., Edison SmartConnect: The Path Forward. Daily Issue Alert 2008 [retrieved on Aug. 28, 2008]. Retrieved from Internet <URL:http://www.energyblogweb.com/issuealert/article.asp?id=2965&Print=True>.

(Continued)

*Primary Examiner* — John R Olszewski
*Assistant Examiner* — Todd Melton
(74) *Attorney, Agent, or Firm* — Ingrassia Fisher & Lorenz, P.C.

(57) ABSTRACT

In accordance with exemplary embodiments, passive release of a charge cord is provided for a vehicle. The vehicle includes a charging port having one or more sensors for detecting movement of the charging cable relative to the charging port. A transceiver responds to the detected movement by transmitting an authentication request and receiving an authentication signal, which is processed by a controller and unlocks the charging cable from the charging port responsive to verifying the authentication signal. In an exemplary method, an authentication request is transmitted responsive to detecting an uncoupling action of the charging cable from a vehicle. Upon receipt and verification of an authentication signal, the charging cable is automatically unlocked and unlatched facilitating release of the charging cable. In accordance with the exemplary embodiments, the charging cable can be passively released from the vehicle.

18 Claims, 8 Drawing Sheets

(56) References Cited

U.S. PATENT DOCUMENTS

| | | | |
|---|---|---|---|
| 6,094,131 | A | 7/2000 | Chen et al. |
| 6,542,071 | B1 | 4/2003 | Ohtsubo et al. |
| 6,617,975 | B1 | 9/2003 | Burgess |
| 7,015,791 | B2 | 3/2006 | Huntzicker |
| 7,444,192 | B2 | 10/2008 | Dickinson et al. |
| 8,025,526 | B1 * | 9/2011 | Tormey et al. ............... 439/528 |
| 8,262,402 | B2 | 9/2012 | Gaul et al. |
| 2004/0183655 | A1 | 9/2004 | Takata |
| 2009/0091291 | A1 | 4/2009 | Woody et al. |
| 2009/0210357 | A1 | 8/2009 | Pudar et al. |
| 2009/0286414 | A1 * | 11/2009 | Ohtomo ........................ 439/299 |
| 2010/0174667 | A1 | 7/2010 | Vitale et al. |
| 2010/0271192 | A1 | 10/2010 | Mituta |
| 2011/0201223 | A1 * | 8/2011 | Kurumizawa et al. ........ 439/345 |
| 2011/0300733 | A1 * | 12/2011 | Janarthanam et al. ........ 439/304 |
| 2011/0306223 | A1 * | 12/2011 | Bauer ........................... 439/136 |
| 2012/0088382 | A1 * | 4/2012 | Konchan ....................... 439/153 |
| 2012/0112697 | A1 * | 5/2012 | Heuer et al. .................. 320/109 |

FOREIGN PATENT DOCUMENTS

| | | |
|---|---|---|
| CN | 101944683 A | 1/2011 |
| JP | 2009136073 A | 6/2009 |
| WO | 2010058742 A1 | 5/2010 |

OTHER PUBLICATIONS

Tendril Volt. Plug in to what's Plugged-In. 2008 [retrieved on Aug. 28, 2008]. Retrieved from Internet <URL:http://www.tendrilinc.com/consumers/products/volt/>.

ZigBee Alliance Smart Energy Certified Products. 2008 [retrieved on Aug. 28, 2008]. Retrieved from Internet <URL:http://www.zigbee.org/en/certification/certified_products_zse.asp>.

Southern California Edison. Advanced Metering Infrastructure. Southern California Edison 2006. [Retrieved on Aug. 28, 2008]. Retrieved from Internet <URL:http://www.sce.com/ami>.

Designing the Future: A Smart Grid Newsletter Case Study, Nov. 2006. [Retrieved on Aug. 28, 2008]. Retrieved from Internet <URL:http://www.smartgridnews.com>.

Southern California Edison. Testimony supporting application for approval of advanced metering infrastructure pre-deployment activities and cost recovery mechanism, Dec. 21, 2006. Obtained on Aug. 28, 2008, vol. 1.

Coulomb Technologies, Inc. "The ChargePoint Network as a Platform for Advanced Services," [Retrieved on Apr. 14, 2009]. Retrieved from Internet: <URL:http://chargepoint.fatcow.com/library/chargepoint_datasheet.php>.

Coulomb Technologies, Inc. "ChargePoint Network Operating System," [Retrieved on Apr. 14, 2009]. Retrieved from Internet: <URL:http://chargepoint.fatcow.com/library/NOS_datasheet.php>.

Coulomb Technologies, Inc. "Smartlet Networked Charging Stations," [Retrieved on Apr. 14, 2009]. Retrieved from Internet: <URL: http://chargepoint.fatcow.com/library/smartlet_datasheet.php>.

Coulomb Technologies, Inc. "Plug-In Vehicles: Taking Charge of an Enabling Infrastructure," Jul. 2008, pp. 1-4. [Retrieved on Apr. 14, 2009]. Retrieved from Internet: <URL: http://www.coulombtech.com/library/PPHEVCI-final.pdf>.

German Patent and Trademark Office, Office Action for German Patent Application No. 10 2012 203 312.2, mailed Apr. 10, 2013.

State Intellectual Property Office of the Peoples' Republic of China, Office Action for Chinese Patent Application No. 201210059308.4, mailed Jan. 20, 2014.

* cited by examiner

PASSIVE CHARGE CORD RELEASE SYSTEM FOR AN ELECTRIC VEHICLE

TECHNICAL FIELD

The subject matter described in this application generally relates to systems and methodologies for charging electric vehicles or hybrid electric vehicles, and more particularly, to systems and methodologies for passive release (unlocking and unlatching) of a charge cord for plug-in electric vehicles or hybrid electric vehicles.

BACKGROUND

Plug-in electric and hybrid electric vehicles are becoming increasingly popular. These vehicles are known as plug-in vehicles because onboard energy storage systems (e.g., battery packs) are recharged from a power source, such as a utility power source, by connecting (plugging in) the vehicle to an outlet.

In a typical charging situation, an electric (or hybrid electric) vehicle is connected to a local power grid at a home location (for example) and the onboard energy storage system is charged from the local power grid. However, it may also be desirable (or necessary) to charge the vehicle at locations other than the driver's home (or other base location), such as by plugging the vehicle into a charging station at a parking facility or the driver's place of business. In these remote charging situations, it is often desirable to lock the charging cord (or cable) into the vehicle during charging, until such time as the vehicle is unplugged by the driver.

Thus, a user's first interaction with a plug-in vehicle is not to enter the vehicle, but rather, to attend to (unplug) the charging cord so that the vehicle may be operated by the driver. Accordingly, it is desirable to provide systems and methods that facilitate user interaction with plug-in vehicles. Additionally, other desirable features and characteristics of the present invention will become apparent from the subsequent description taken in conjunction with the accompanying drawings and the foregoing technical field and background.

BRIEF SUMMARY

In accordance with an exemplary embodiment, passive release of a charge cord is provided by transmitting an authentication request responsive to detecting an uncoupling action of the charging cable from a vehicle. Upon receipt and verification of an authentication signal, the charging cable is automatically unlocked facilitating release of the charging cable.

In accordance with an exemplary embodiment, passive release of a charge cord is provided by transmitting an authentication request responsive to detecting an uncoupling action of the charging cable from a vehicle. Upon receipt and verification of an authentication signal, the charging cable is automatically unlocked and unlatched facilitating release of the charging cable.

In accordance with an exemplary embodiment, passive release of a charge cord is provided in a vehicle with a charging port having one or more sensors for detecting movement of the charging cable relative to the charging port. A transceiver responds to the detected movement by transmitting an authentication request and receiving an authentication signal which is processed by a controller, and which unlocks the charging cable from the charging port responsive to verifying the authentication signal. In this way, the charging cable can be unlatched and released from the vehicle.

DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
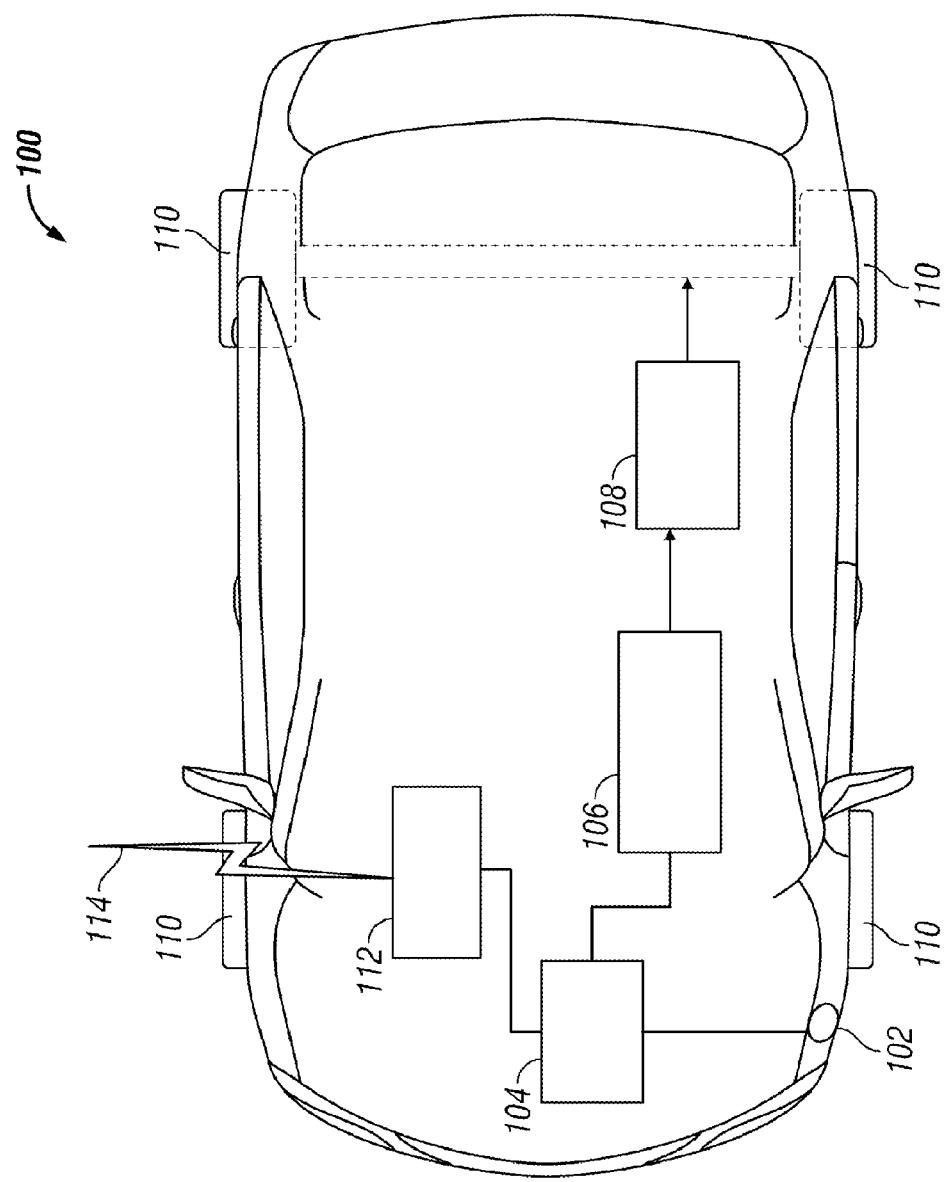
FIG. 1 is an illustration of an automobile according to an exemplary embodiment.

FIG. 1 is a simplified schematic representation of an embodiment of a vehicle 100 according to the present disclosure. Although vehicle 100 is illustrated as a purely electric vehicle, the techniques and concepts described herein are also applicable to hybrid electric vehicles. The illustrated embodiment of plug-in vehicle 100 includes, without limitation: a plug-in charging port 102; a charging control module 104 coupled to an onboard energy storage system 106; an electric propulsion system 108 driving wheels 110; and an onboard data communication system 112, which according to embodiments of the present disclosure, is coupled to the charge control module 104 for bi-directional communication 114 supporting a passive charge cord release (unlock/unlatch) system and method described below in detail.

The plug-in charging port 102 may be configured as any suitable charging interface, and in one embodiment, comprises a charging receptacle compatible with the current (as of the filing of this application) J1772 standard, which receives a charging cable with compatible plug (not shown). The charging control module 104, may include any type of processing element or vehicle controller, and may be equipped with nonvolatile memory, random access memory (RAM), discrete and analog input/output (I/O), a central processing unit, and/or communications interfaces for networking within a vehicular communications network. Onboard energy storage system 106 may be realized as a rechargeable battery pack having a single battery module or any number of individual battery modules. Onboard energy storage system 106 provides electrical energy that enables electric propulsion system 108 to provide traction power to wheels 110.

While FIG. 1 is a schematic diagram that depicts various electrical and mechanical connections and couplings in a very simplified manner for ease of description, an actual embodiment of vehicle 100 will of course utilize additional physical components and devices that are well known in the automotive industry. Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

Figure 2A:
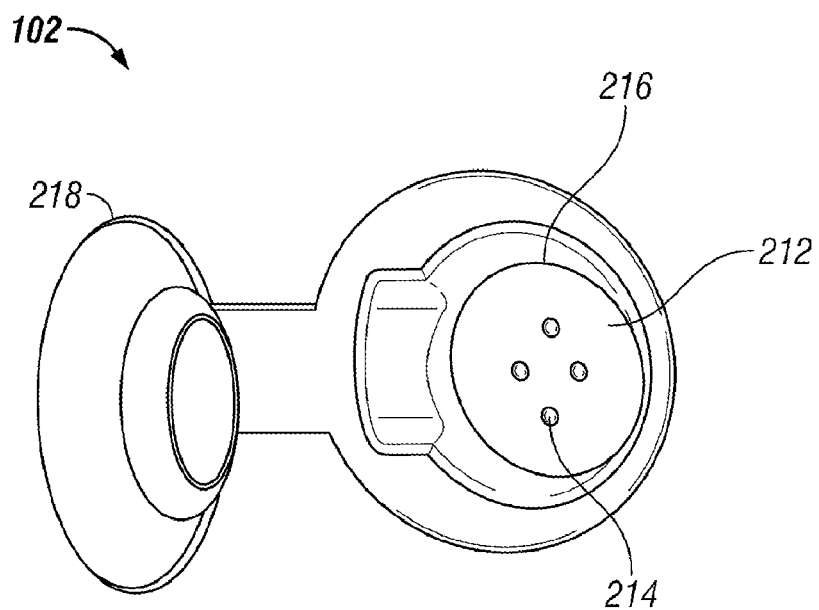
FIGS. 2A and 2B are illustrations of an exemplary charging port and charging cable suitable for use in the vehicle of FIG. 1.
Figure 2B:
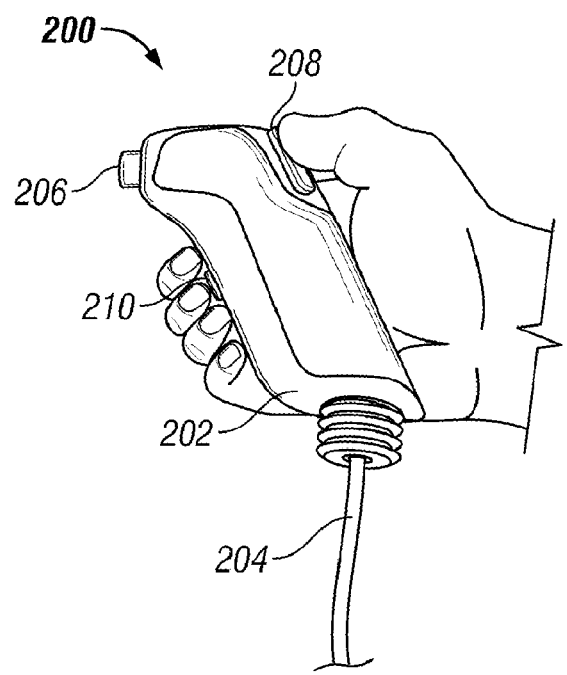

FIGS. 2A and 2B are illustrations of an exemplary plug-in charging port 102 and compatible charging cable (with plug) 200. As previously mentioned, in one embodiment, the plug-in charging port 102 and the charging cable 200 are compatible with the current (as of the filing of this application) J1772 standard. The charging cable 200 includes an assembly 202 configured to any convenient shape (e.g., handle) for facilitating a user plugging in the cable 200. The assembly 202 electrically couples conductors 204 from a power grid (not shown) to a plug 206 that has a mating interface with the charging port 102. In some embodiments, charging cord 200 includes a charge cord release mechanism which may be operated by a thumb actuator (e.g., switch or sensor) 208 or a finger actuator (e.g., trigger or lever) 210 for the convenience of the user. The plug 206 of the charging cable 200 interfaces with a receptacle 212 of the plug-in charging port 102, which may also include a locating or guide keyway 214 and a receptacle latch 216 for retaining the charging cable 200 in place during a charging session. Also included in some embodiments is a door 218 that covers the receptacle 212 for damage protection of the receptacle 212 and aesthetic appearance of the vehicle 100.

Figure 3:
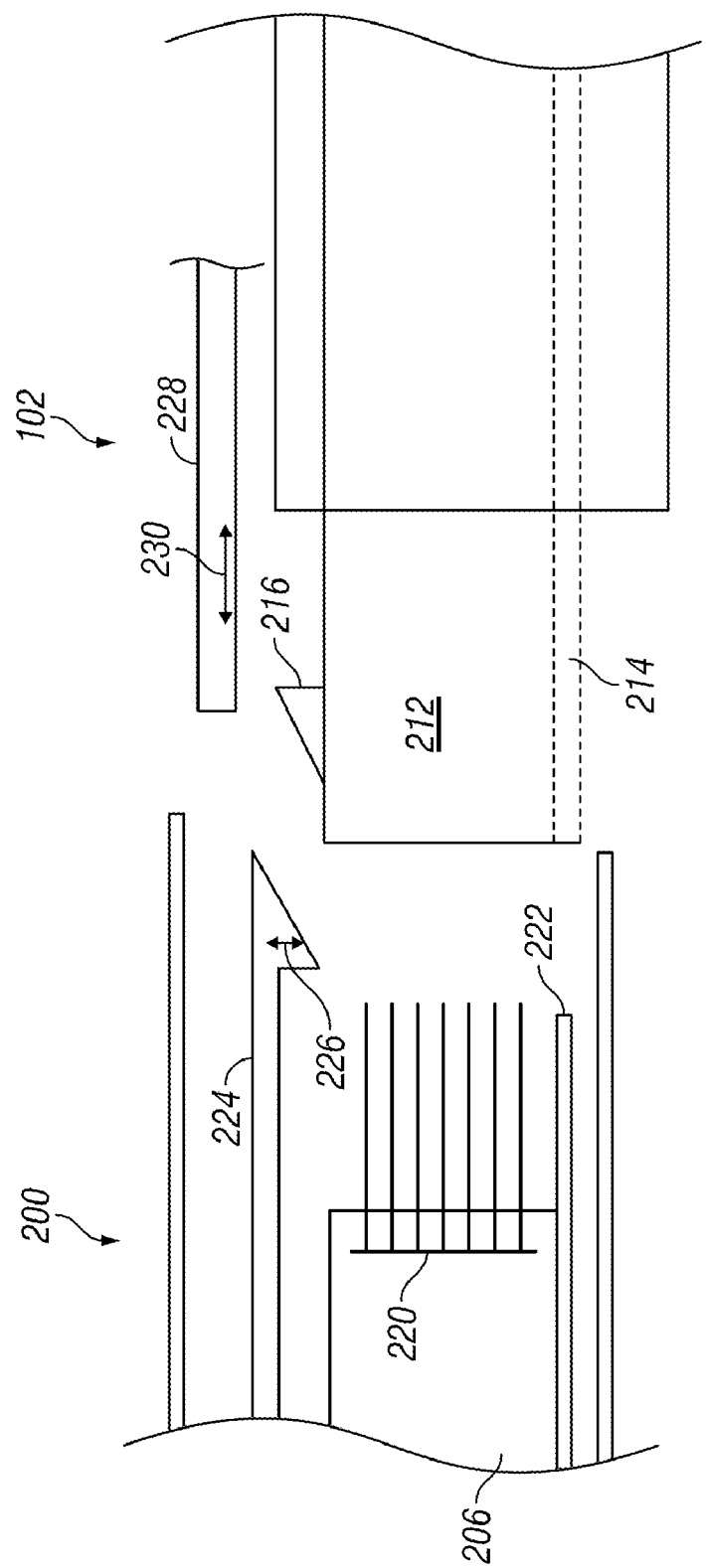
FIG. 3 is an illustration of the exemplary charging port and charging cable of FIGS. 2A and 2B in an unlatched/unlocked position according to an exemplary embodiment.

Referring to FIG. 3, an illustration of the plug-in charging port 102 and charging cable 200 in an unlatched/unlocked position is shown. As illustrated, the plug 206 is aligned with the receptacle 212 so that electrodes 220 can conduct a charging current from the power grid (not shown) to the charging control module (104 of FIG. 1) of the vehicle. A guide pin 222 is also aligned to mate with the recess or keyway 214, which aids in proper plug/receptacle connection. As previously mentioned, a cable latch 224 may be employed to prevent dislodgment or uncoupling of the plug/receptacle connection. Upon operation of the release mechanism (for example 208 or 210 of FIG. 2B) the cable latch 224 moves upward (as indicated by arrow 226) such that it clears receptacle latch 216 so that the charging cable 200 can be removed. Additionally, it may be desirable to lock the charging cable 200 to the vehicle 100 to prevent is removal by other than the owner or operator of the vehicle. In one embodiment, a locking bolt 228 moves longitudinally (as indicated by arrow 230) to advance over the cable latch 224, which prevents it from rising (226) over the receptacle latch 216 as can be viewed with reference to FIG. 4 below.

Figure 4:
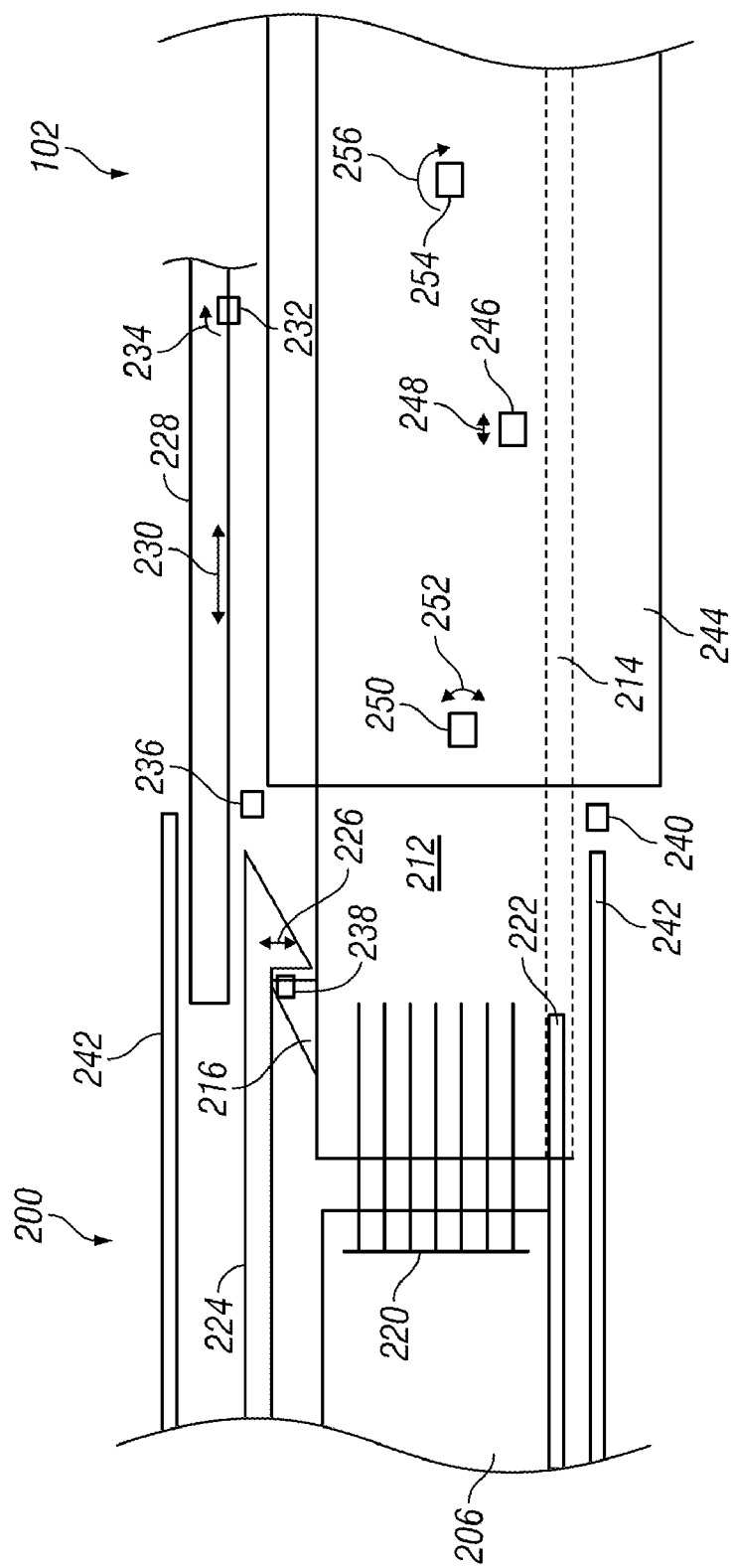
FIG. 4 is an illustration of the exemplary charging port and charging cable of FIGS. 2A and 2B in a latched and locked position useful for understanding various exemplary embodiments.

FIG. 4 is an illustration of the plug-in charging port 102 and charging cable 200 in a latched (inter-coupling of 216 and 224) and locked (228 blocking the rise of 224) position. According to the various embodiments of the present disclosure, switches or sensors are incorporated into the plug-in charging port 102, that in cooperation with other circuitry of the vehicle, provide a passive charging cable release system. That is, upon detection of a user attempting to unplug the charging cable 200, the charging control module (104 of FIG. 1) causes the communication system (112 of FIG. 1) to transmit an authentication request. An item in possession of the user (e.g., key fob, RFID device, cell phone, PDA or other device) responds with an authentication signal, which in turn causes the unlocking (or in some embodiments both the unlocking and unlatching) of the charging cable 200 facilitating its release from the vehicle. In this way, the charging cable 200 can be passively released (unlocked or both unlocked and unlatched) and decoupled from the vehicle without the user having to take a separate affirmative action such as activating a key fob or operating a key in a lock to unlock the charging cable (sometimes referred to as a keyless operation).

Referring still to FIG. 4, several embodiments of the present disclosure are illustrated. In one embodiment, a switch or sensor 232 is positioned to detect a rotational force 234 (or equivalent vertical force) on the locking bolt 228. Such a rotational force could be caused by the user actuating a release mechanism (208 or 210 of FIG. 2B) causing the cable latch 224 to rise and exert force on the locking bolt 228. Responsive to the switch or sensor 232 detecting the applied force 234, the changing control module (104 of FIG. 1) causes the communication unit (112 of FIG. 1) to transmit an authentication request to an item in possession of the user (e.g., key fob, RFID device, cell phone, PDA or other device). Upon receiving a correct authentication signal, the charging controller causes the locking bolt 228 to be withdrawn or retracted (230) into the charging port thereby freeing the cable latch 224 to rise (226) over the receptacle latch 216 and release the charging cable 200 from the plug-in charging port 102.

Numerous other embodiments are possible for detecting motion of the charging cable 200 relative to the charging port 102. For example, a switch or sensor 236 (or 238) could be positioned as shown in FIG. 4 so that a pushing action (in the case of sensor 236) or a pulling action (in the case of sensor 238) on the charging cable 200 would cause the transmission of the authentication request by detecting movement of the cable latch 224. After the locking bolt 228 is retracted following receipt of the correct authentication signal (collectively, the authentication process), the cable latch 224 could be disengaged by the user and the charging cable released and disconnected from the vehicle. Similarly, a switch or sensor 240 could detect a pushing action (or compression) between the cable housing 242 and the receptacle housing 244 to initiate the authentication process. In any of these embodiments, the authentication process may also cause the charging control module (104 in FIG. 1) to automatically unlock one or more doors of the vehicle 100 so that the user can easily enter the vehicle after the locking bolt 228 has been withdrawn and the charging cable 200 has been unplugged from the charging port 102.

Referring still to FIG. 4, still other embodiments are possible if the receptacle housing 244 is configured to have some motion relative to the receptacle 212. In this way, user interaction with the charging cable creates detectable motion between the receptacle housing 244 and the receptacle 212, and thus, indirectly detects motion between the charging cable 200 and the charging port 102. For example, a switch or sensor 246 could detect a pushing or pulling motion (248) of the receptacle housing 244 to initiate the authentication process. Also, switch(es) or sensor(s) 250 could detect a bending motion 252 (e.g., right, left, up or down) caused by the user flexing the charging cable 200. Still further, a switch or sensor 254 could detect a rotational movement (256) and trigger the transmission of the authentication request and initiate the authentication process.

In the multitude of embodiments described in conjunction with FIG. 4, the passive charge cord release (unlock/unlatch) system of the present disclosure simplifies and facilitates user interaction with the vehicle. While several possible switch or sensor positions have been illustrated, a number of other positions are possible. Also, the present disclosure contemplates that several switches or sensors may be employed in various particular embodiments, enabling the user to select (for example via programming) which user action she/he prefers for the charging cord unlatch/unlock operation(s). It is also contemplated that multiple users of a vehicle may each select his/her own passive release action that would be associated with his/her own authentication device (e.g., key fob). That is, multiple authentication requests could be transmitted, or multiple received authentication signals could be processed for verification. Moreover, by automatically unlocking the door(s) of the vehicle as part of the passive charge cord release process, user convenience is maximized for her/his operation and enjoyment of the vehicle.

Figure 5:
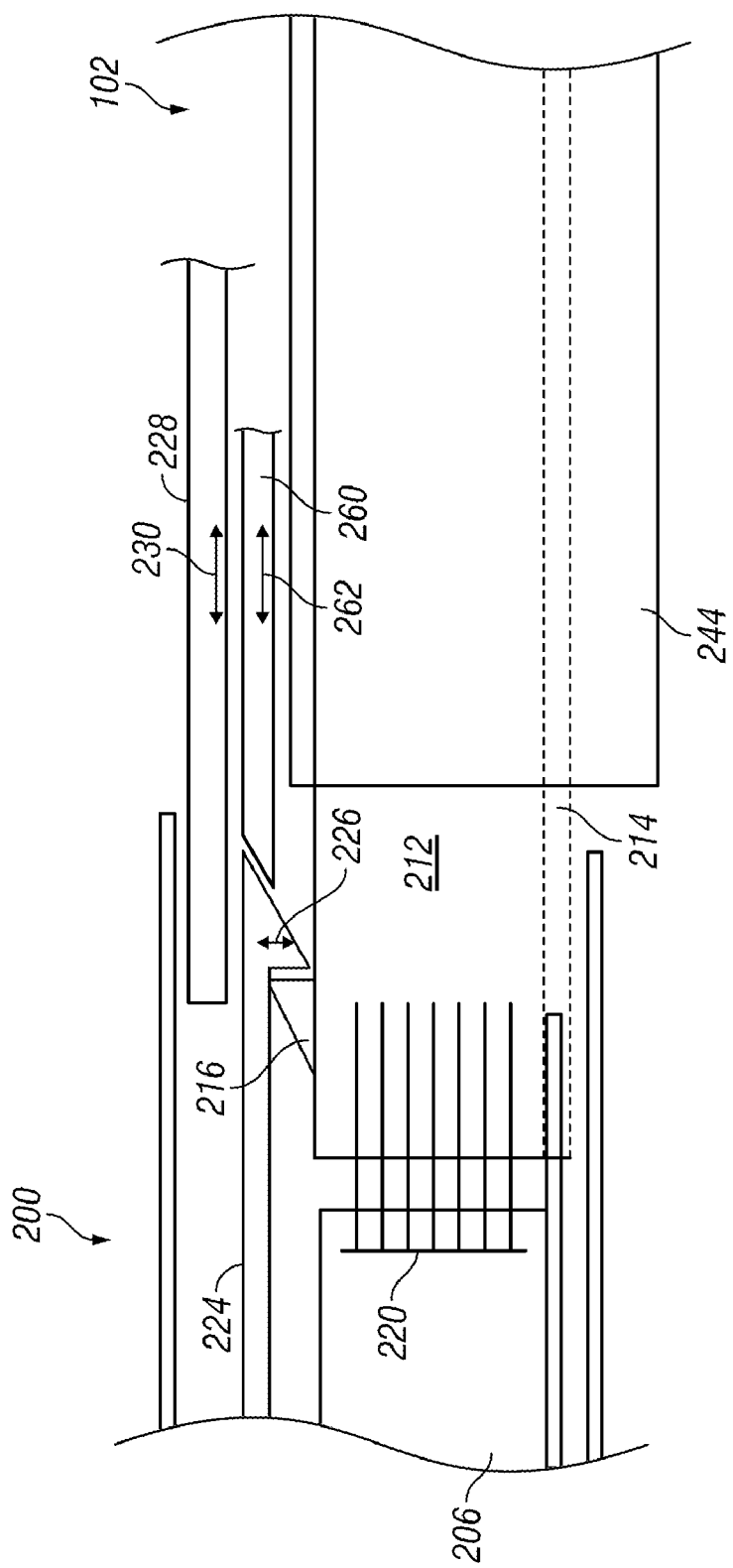
FIG. 5 is an illustration of the exemplary charging port and charging cable of FIGS. 2A and 2B in a latched and locked position useful for understanding further exemplary embodiments.

In FIG. 5, several other embodiments of the present disclosure are illustrated. For convenience, description of like reference numerals for like elements of FIG. 4 are omitted as well as the numerous possible positions for switches or sensors, which would operate as described in conjunction with FIG. 4. Operationally, the added feature of the embodiments of FIG. 5 center around an automatic unlatching bolt 260. For whatever sensor arrangement is used to detect a user unplugging the charging cable 200, in addition to the locking bolt 228 being withdrawn or retracted (230), an opposite motion (262) is made by the unlatching bolt 260, which results in the lifting the cable latch 224 over the receptacle latch 216 (due in the illustrated embodiment to the beveled surfaces), so that automatic unlocking and unlatching occur in a single operation. In this way, upon detecting a user unplugging the charging cable 200, and following the authentication process, the charging cable can be unlocked and unlatched for the convenience of the user of the vehicle. Moreover, with the arrangement illustrated in FIG. 5, the charge cord release mechanism (208 or 210 of FIG. 2B) can be eliminated since charging cable release occurs automatically following the authentication process.

Figure 6A:
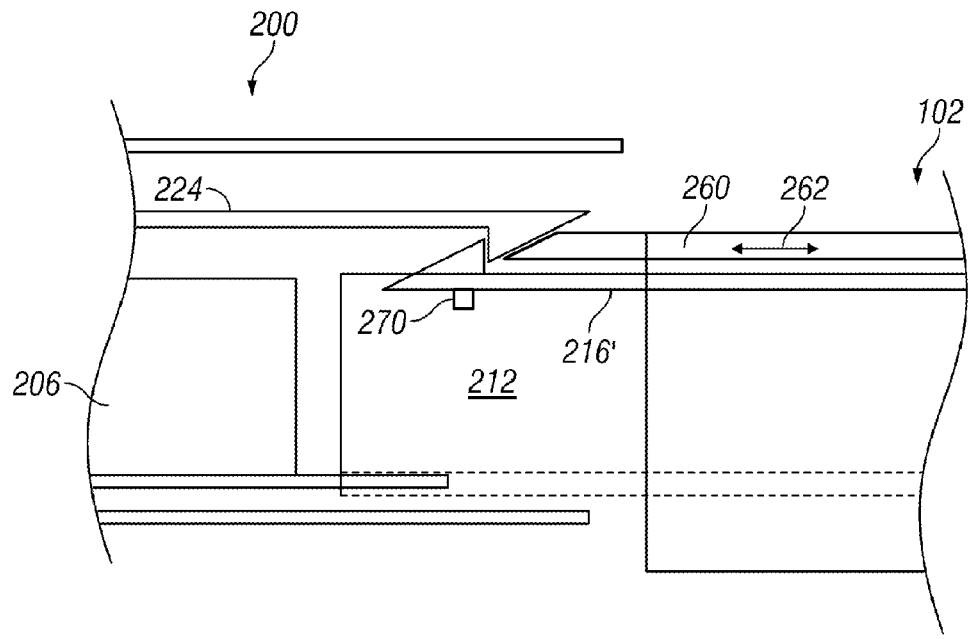
FIGS. 6A-6C are illustrations of the exemplary charging port and charging cable of FIGS. 2A and 2B in a latched and locked position useful for understanding still further exemplary embodiments.
Figure 6B:
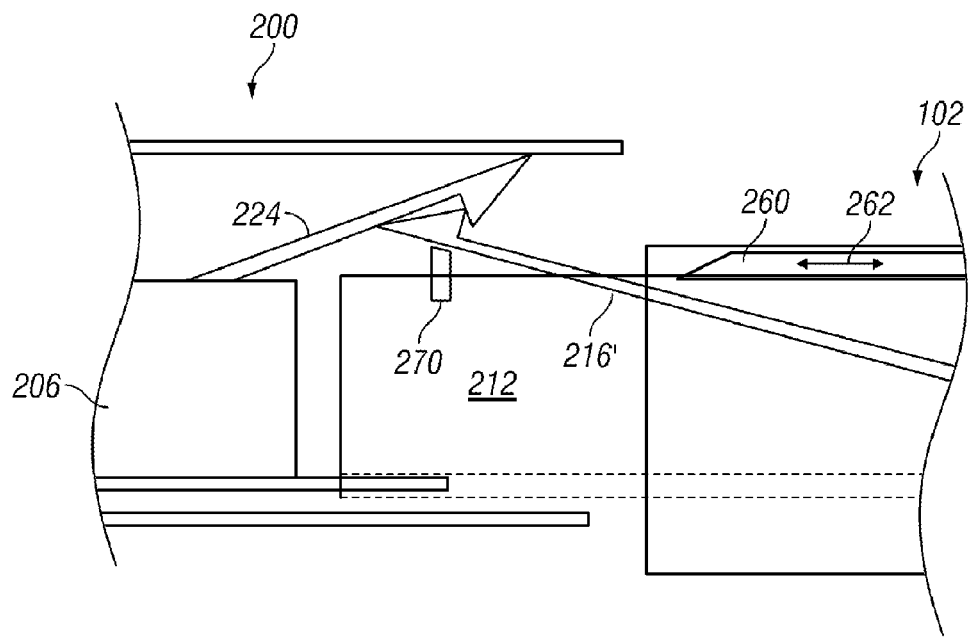
Figure 6C:
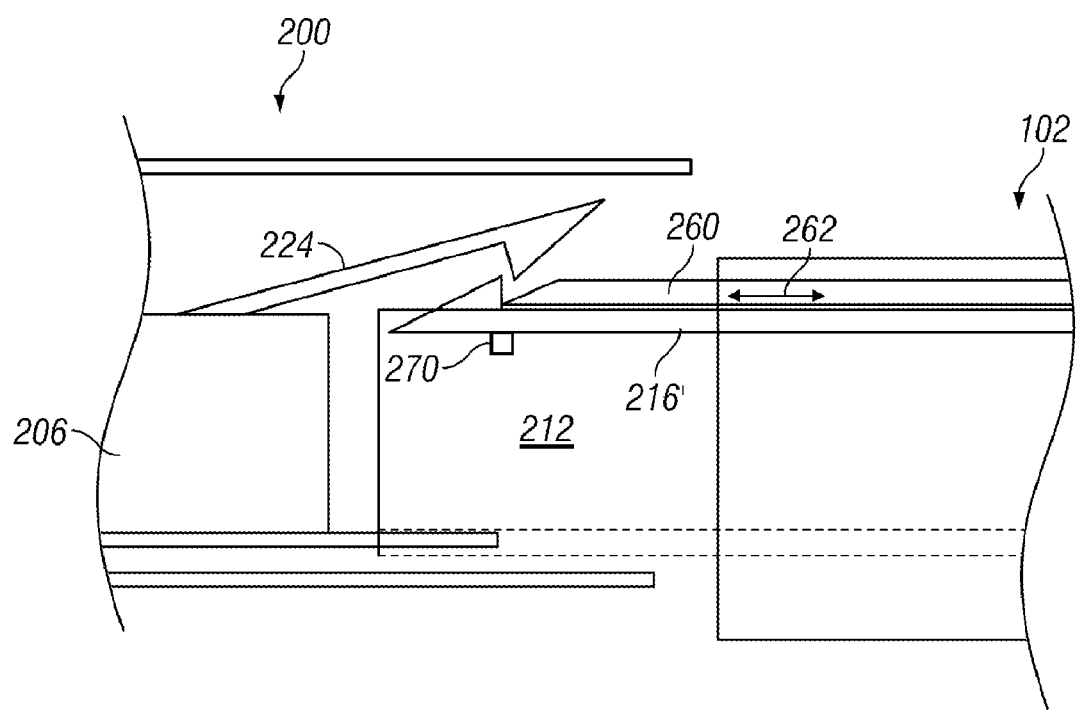

In FIGS. 6A-6C, several other embodiments of the present disclosure are illustrated. For convenience, description of like reference numerals for like elements of FIG. 4 are omitted as well as the numerous possible positions for switches or sensors, which would operate as described in conjunction with FIG. 4. Operationally, the added feature of the embodiments of FIGS. 6A-6C center around the receptacle latch 216'. Instead of being an integral component of the receptacle 212, the receptacle latch 216' moves in relation to the receptacle latch to both latch and lock the cable latch 224 under control of a biasing element 270. In FIG. 6A, charging cable 200 is plugged into the charging port 102, which can be detected by monitoring current flow into the vehicle or by a switch or sensor (such as 236 or 238 of FIG. 4). Upon detection of a plugged-in condition, the unlatching bolt 260 is withdrawn (262), releasing the receptacle latch 216' to rise due to the biasing element 270 as shown in FIG. 6B. This simultaneously latches and locks the charging cable 200 into the plug-in charging port 102 since the cable latch 224 cannot be released by operating a release mechanism (such as 208 or 210 of FIG. 2B) associated with the charging cable 200. The biasing element 270 may comprise a spring (such as a coil or leaf spring) or may be embodied as a electro-magnetic solenoid or a bellows expanded by a liquid or gas under sufficient pressure to hold the receptacle latch 216' engaged with the cable latch 224. Using any of the switch or sensor arrangements discussed in conjunction with FIG. 4, and following completion of the authentication process, the unlatching bolt 260 advances (262) retracting the receptacle latch 216' and engaging the surface of the cable latch 224 to lift it free of the receptacle latch as illustrated in FIG. 6C.

Figure 7:
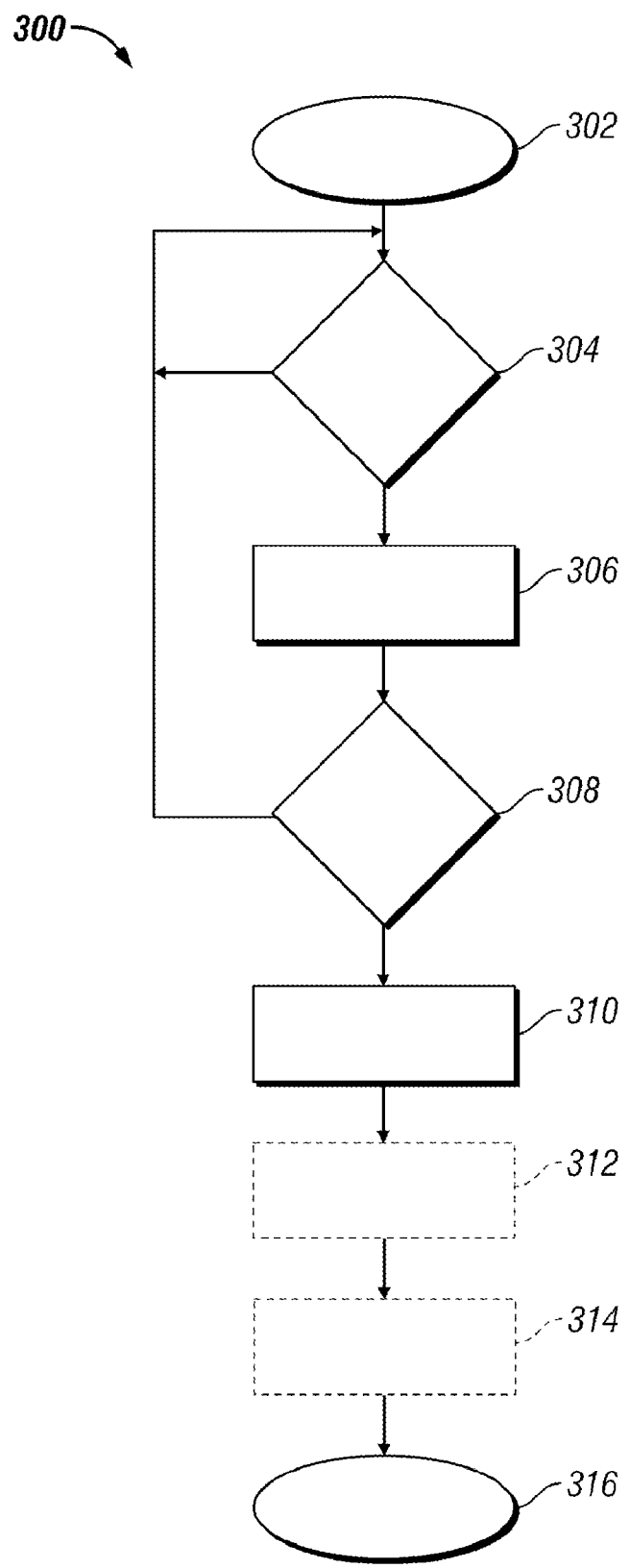
FIG. 7 is flow diagram of a method in accordance with an exemplary embodiment.

FIG. 7 is a flow diagram of an exemplary method or algorithm 300 in accordance with the present disclosures. The steps of the method or algorithm 300 described herein may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary processor may reside in the charging control module (104 of FIG. 1) or in any other convenient location in the vehicle.

The routine starts (302) by determining in decision 304 whether a user unlatching (or uncoupling) action of the charging cable has been detected. This can be accomplished using any of the variety or combination of switches or sensors described above in conjunction with FIGS. 4-6. Upon detection of a user unlatching action, the authentication request is transmitted (step 306), such as by the communication system 112 of FIG. 1. Next, decision 308 determines (verifies) whether a correct authentication signal has been received. If so, then the authentication process is complete and the routine proceeds to step 310, which automatically unlocks the charging cable 200 so that it be removed (unlatched) by the user. Conversely, if the determination of the decision 308 is that an incorrect authentication signal (or no authentication signal) as been received, or in the event that decision 304 fails to detect a user unplugging action, the routine begins again with decision 304.

After unlocking the charging cable 200, the method or algorithm 300 may optionally include an automatic unlatching operation (step 312) as discussed in conjunction with FIGS. 5 and 6. Finally, the routine may also include the optional step of unlocking one or more doors of the vehicle (step 314) prior to the end of the routine 316. In the way, the present disclosure offers multiple embodiments for a passive charging cord release (unlocking and unlatching) system for the convenience of users of electric or hybrid electric vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method, comprising:
    transmitting an authentication request responsive to detecting an uncoupling action for a charging cable coupled to a vehicle; and
    receiving an authentication signal and unlocking the charging cable from the vehicle upon verification of the authentication signal;
    wherein the charging cable can be released from the vehicle.

2. The method of claim 1, wherein the step of unlocking the charging cable from the vehicle further comprises automatically unlatching the charging cable from the vehicle.

3. The method of claim 1, wherein the step of detecting the uncoupling action for the charging cable further comprises detecting movement of the charging cable relative to a charging port.

4. The method of claim 3, wherein the step of detecting movement of the charging cable relative to a charging port comprises detecting at least one motion of the following group of motions: push, pull, bend or rotate.

5. The method of claim 3, wherein the step of unlocking the charging cable from the vehicle further comprises automatically unlatching the charging cable from the charging port.

6. The method of claim 1, wherein the step of unlocking the charging cable from the vehicle further comprises automatically unlocking a door on the vehicle.

7. A method, comprising:
    initiating authentication process responsive to detecting an user interaction with a charging cable coupled to a vehicle; and
    unlocking the charging cable from the vehicle upon completion of the authentication process facilitating releasing the charging cable from the vehicle.

8. The method of claim 7, wherein the authentication process comprises transmitting an authentication request and verifying reception of a correct authentication signal.

9. The method of claim 7, wherein the step of unlocking the charging cable from the vehicle further comprises automatically unlatching the charging cable from a charging port of the vehicle.

10. The method of claim 7, wherein the step of unlocking the charging cable from the vehicle further comprises automatically unlocking a door on the vehicle.

11. A vehicle having a passive charging cable release system, comprising:
    a charging port having one or more sensors for detecting movement of a charging cable relative to the charging port;
    a transceiver responsive to the one or more sensors for transmitting an authentication request and receiving an authentication signal; and
    a controller coupled to the transceiver and to the one or more sensors for unlocking the charging cable from the charging port responsive to verifying the authentication signal.

12. The vehicle having the passive charging cable release system of claim 11, further comprising a locking bolt configured to be retracted into the charging port permitting operation of a charging cable latch to release the charging cable from the charging port.

13. The vehicle having the passive charging cable release system of claim 11, further comprising an unlatching bolt configured to automatically release a charging cable latch to release the charging cable from the charging port.

14. The vehicle having the passive charging cable release system of claim 11, further comprising a charging port receptacle latch biased to engage a charging cable latch, the charging port receptacle latch configured to selectively release the charging cable latch thereby releasing the charging cable from the charging port.

15. The vehicle having the passive charging cable release system of claim 11, wherein the controller unlocks a door of the vehicle responsive to verifying the authentication signal.

16. The vehicle having the passive charging cable release system of claim 11, wherein the one or more sensors detect at least one motion of the following group of motions: push, pull, bend or rotate.

17. The vehicle having the passive charging cable release system of claim 11, wherein the charging port is compliant with the J1772 standard.

18. The vehicle having the passive charging cable release system of claim 11, wherein the controller verifies one of multiple authentication signals received responsive to the authentication request.

* * * * *